(12) United States Patent
Hwang et al.

(10) Patent No.: US 11,012,943 B2
(45) Date of Patent: May 18, 2021

(54) METHOD FOR REDUCING INTERFERENCE BETWEEN UPLINK SIGNAL AND DOWNLINK SIGNAL, AND DEVICE THEREFOR

(71) Applicant: LG ELECTRONICS INC., Seoul (KR)

(72) Inventors: Daesung Hwang, Seoul (KR); Seungmin Lee, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/335,658

(22) PCT Filed: Sep. 21, 2017

(86) PCT No.: PCT/KR2017/010360
§ 371 (c)(1),
(2) Date: Mar. 21, 2019

(87) PCT Pub. No.: WO2018/056707
PCT Pub. Date: Mar. 29, 2018

(65) Prior Publication Data
US 2019/0306803 A1  Oct. 3, 2019

Related U.S. Application Data

(60) Provisional application No. 62/398,499, filed on Sep. 22, 2016.

(51) Int. Cl.
*H04W 52/14* (2009.01)
*H04W 52/24* (2009.01)
(Continued)

(52) U.S. Cl.
CPC .......... *H04W 52/143* (2013.01); *H04W 52/14* (2013.01); *H04W 52/24* (2013.01);
(Continued)

(58) Field of Classification Search
CPC ... H04W 52/24; H04W 52/38; H04W 72/082; H04W 52/243; H04W 72/042; H04W 52/36
See application file for complete search history.

(56) References Cited

U.S. PATENT DOCUMENTS

| | | | |
|---|---|---|---|
| 9,614,654 B2 * | 4/2017 | Gaal | H04L 5/0053 |
| 2012/0057547 A1 * | 3/2012 | Lohr | H04L 5/0064 370/329 |

(Continued)

FOREIGN PATENT DOCUMENTS

| | | |
|---|---|---|
| EP | 2860903 | 4/2015 |
| JP | 2014183486 | 9/2014 |

(Continued)

OTHER PUBLICATIONS

PCT International Application No. PCT/KR2017/010360, Written Opinion of the International Searching Authority dated Dec. 13, 2017, 26 pages.

(Continued)

*Primary Examiner* — Syed Ali
(74) *Attorney, Agent, or Firm* — Lee Hong Degerman Kang Waimey

(57) ABSTRACT

The present invention provides a method for a base station to transmit a downlink signal, in order to reduce interference between uplink transmission and downlink transmission in a wireless communication system. Particularly, the method is characterized by: a step of setting a power decrease region in which downlink transmission power is transmitted by being lower than that of another region; a step of separating (Continued)

and generating a first transmission block corresponding to the power decrease region, and a second transmission block not corresponding to the power decrease region; and a step of mapping downlink data to the first transmission block and the second transmission block, respectively, wherein the first transmission block is transmitted with the power allocated to the power decrease region, and the second transmission block is transmitted with the power allocated to the region other than the power decrease region.

14 Claims, 9 Drawing Sheets

(51) Int. Cl.
*H04W 72/04* (2009.01)
*H04W 72/08* (2009.01)
*H04W 52/36* (2009.01)
*H04W 52/34* (2009.01)
*H04W 88/08* (2009.01)

(52) U.S. Cl.
CPC ......... *H04W 52/243* (2013.01); *H04W 52/34* (2013.01); *H04W 52/36* (2013.01); *H04W 72/042* (2013.01); *H04W 72/082* (2013.01); *H04W 88/08* (2013.01)

(56) References Cited

U.S. PATENT DOCUMENTS

| | | | |
|---|---|---|---|
| 2013/0322235 A1 | 12/2013 | Khoryaev et al. | |
| 2014/0321422 A1* | 10/2014 | Choi | H04L 5/0055 370/330 |
| 2015/0092645 A1* | 4/2015 | Tabet | H04L 1/1671 370/311 |
| 2015/0146644 A1* | 5/2015 | Kim | H04L 5/0035 370/329 |
| 2016/0112178 A1 | 4/2016 | Yi et al. | |
| 2016/0135147 A1 | 5/2016 | Ouchi et al. | |
| 2018/0098337 A1* | 4/2018 | Lee | H04W 72/1278 |

FOREIGN PATENT DOCUMENTS

| | | |
|---|---|---|
| KR | 1020080028820 | 4/2008 |
| KR | 1020140080198 | 6/2014 |
| KR | 10-2015-0019217 | 2/2015 |
| KR | 1020150103973 | 9/2015 |
| KR | 1020160099095 | 8/2016 |
| KR | 1020160102178 | 8/2016 |
| WO | 2012020990 | 2/2012 |
| WO | 2014017155 | 1/2014 |
| WO | 2014109302 | 7/2014 |
| WO | 2015018004 | 2/2015 |
| WO | 2016002323 | 1/2016 |

OTHER PUBLICATIONS

Korean Intellectual Property Office Application No. 110-2019-7007071, Notice of Allowance dated Jan. 27, 2021, 2 pages.

* cited by examiner

FIG. 2
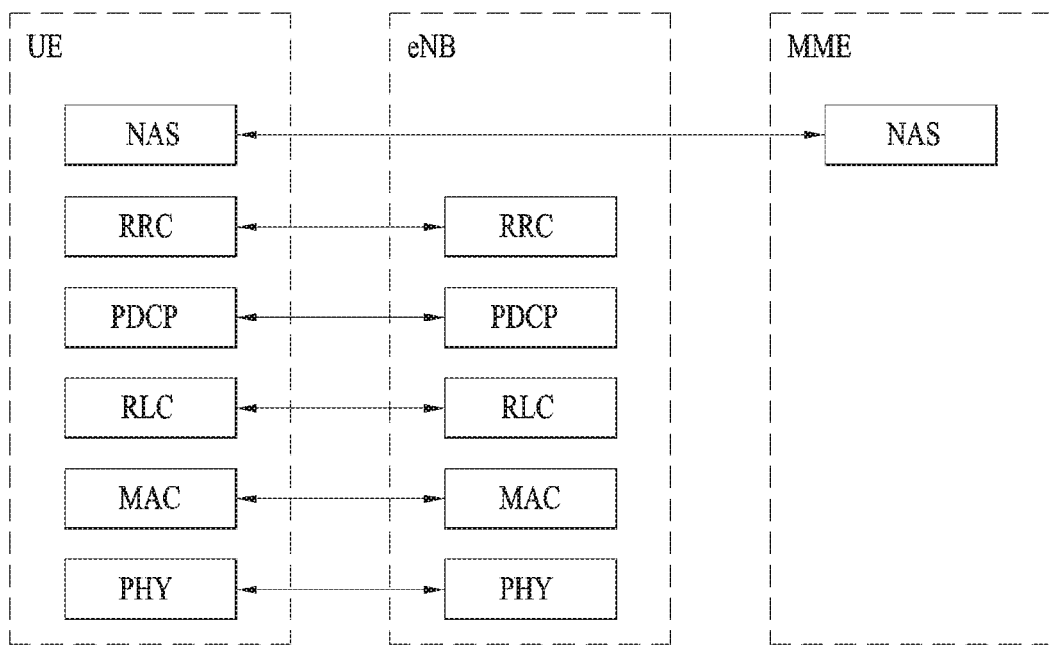
(A) CONTROL-PLANE PROTOCOL STACK
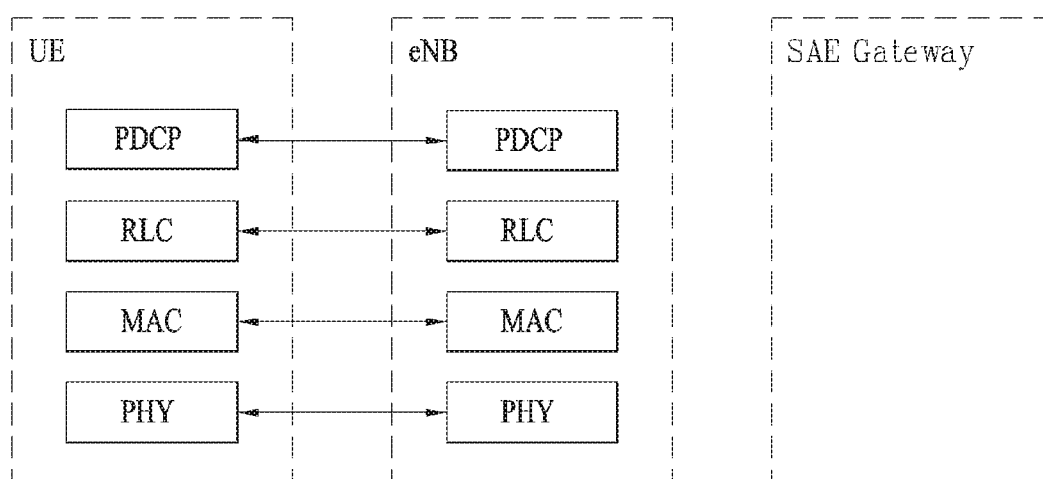
(B) USER-PLANE PROTOCOL STACK

METHOD FOR REDUCING INTERFERENCE BETWEEN UPLINK SIGNAL AND DOWNLINK SIGNAL, AND DEVICE THEREFOR

CROSS-REFERENCE TO RELATED APPLICATIONS

This application is the National Stage filing under 35 U.S.C. 371 of International Application No. PCT/KR2017/010360, filed on Sep. 21, 2017, which claims the benefit of U.S. Provisional Application No. 62/398,499, filed on Sep. 22, 2016, the contents of which are all hereby incorporated by reference herein in their entirety.

TECHNICAL FIELD

The present invention relates to a method of reducing interference between an uplink signal and a downlink signal in a wireless communication system and apparatus therefor, and more particularly, to a method of reducing interference between an uplink signal and a downlink signal in a wireless communication system by adjusting power of the downlink signal according to configuration of duration for performing a power reduction operation and apparatus therefor.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 MHz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE OF THE INVENTION

Technical Task

One technical task of the present invention is to provide a method of reducing interference between an Uplink (UL) signal and a Downlink (DL) signal in a wireless communication system and apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of transmitting a downlink signal by a base station in a wireless communication system, the method including configuring a power reduction region for performing a transmission with a downlink transmission power lower than that of a different region, generating a first transport block corresponding to the power reduction region and a second transport block failing to correspond to the power reduction region separately, mapping downlink data to each of the first transport block and the second transport block, and transmitting the first transport block and the second transport block with a power assigned to the power reduction region and a power assigned to a region other than the power reduction region, respectively.

The power assigned to the power reduction region may be determined by applying an offset to the power assigned to the region other than the power reduction region.

The region assigned to the power reduction region may be determined by applying a preset ratio value to the power assigned to the region other than the power reduction region.

If a transmission/reception timing of the base station and a neighbor base station is synchronized, a region reserved for an uplink transmission may be configured as the power reduction region. If the transmission/reception timing of the base station and the neighbor base station is not synchronized, the power reduction region may be configured by a higher layer.

The method may further include transmitting information on the power reduction region to a user equipment in a manner that the information is contained in Downlink Control Information (DCI).

The method may further include transmitting information on one or more candidate regions configurable as the power reduction region to a user equipment through higher layer signaling.

The power reduction region may be configured based on traffic information received from a neighbor cell.

The power reduction region may be configured based on a priority configured according to a type of the downlink signal and a type of an uplink signal.

In another technical aspect of the present invention, provided herein is a base station in transmitting a downlink signal in a wireless communication system, the base station including an RF module transceiving a wireless signal with a user equipment, and a processor configured to control the RF module, wherein the processor is further configured to configure a power reduction region for performing a transmission with a downlink transmission power lower than that of a different region, generate a first transport block corresponding to the power reduction region and a second transport block failing to correspond to the power reduction region separately, map downlink data to each of the first transport block and the second transport block, and transmit the first transport block and the second transport block with a power assigned to the power reduction region and a power assigned to a region other than the power reduction region, respectively.

The power assigned to the power reduction region may be determined by applying an offset to the power assigned to the region other than the power reduction region.

The region assigned to the power reduction region may be determined by applying a preset ratio value to the power assigned to the region other than the power reduction region.

If a transmission/reception timing of the base station and a neighbor base station is synchronized, a region reserved for an uplink transmission is configured as the power reduction region. If the transmission/reception timing of the base station and the neighbor base station is not synchronized, the power reduction region may be configured by a higher layer.

The processor may transmit information on the power reduction region to the user equipment in a manner that the information is contained in Downlink Control Information (DCI).

The processor may transmit information on one or more candidate regions configurable as the power reduction region to the user equipment through higher layer signaling.

The power reduction region may be configured based on traffic information received from a neighbor cell.

The power reduction region may be configured based on a priority configured according to a type of the downlink signal and a type of an uplink signal.

In further technical aspect of the present invention, provided herein is a method of transmitting an uplink signal by a user equipment in a wireless communication system, the method including configuring a power reduction region for performing a transmission with an uplink transmission power lower than that of a different region, generating a first transport block corresponding to the power reduction region and a second transport block failing to correspond to the power reduction region separately, mapping uplink data to each of the first transport block and the second transport block, and transmitting the first transport block and the second transport block with a power assigned to the power reduction region and a power assigned to a region other than the power reduction region, respectively.

In another further technical aspect of the present invention, provided herein is a user equipment in transmitting an uplink signal in a wireless communication system, the user equipment including an RF module transceiving a wireless signal with a base station and a processor configured to control the RF module, wherein the processor is further configured to configure a power reduction region for performing a transmission with an uplink transmission power lower than that of a different region, generate a first transport block corresponding to the power reduction region and a second transport block failing to correspond to the power reduction region separately, map uplink data to each of the first transport block and the second transport block, and transmit the first transport block and the second transport block with a power assigned to the power reduction region and a power assigned to a region other than the power reduction region, respectively.

Advantageous Effects

According to the present invention, inter-cell or intra-cell interference between a DL signal and a UL signal can be reduced effectively.

It will be appreciated by persons skilled in the art that the effects that can be achieved with the present disclosure are not limited to what has been particularly described hereinabove and other advantages of the present disclosure will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE FOR INVENTION

Figure 1:
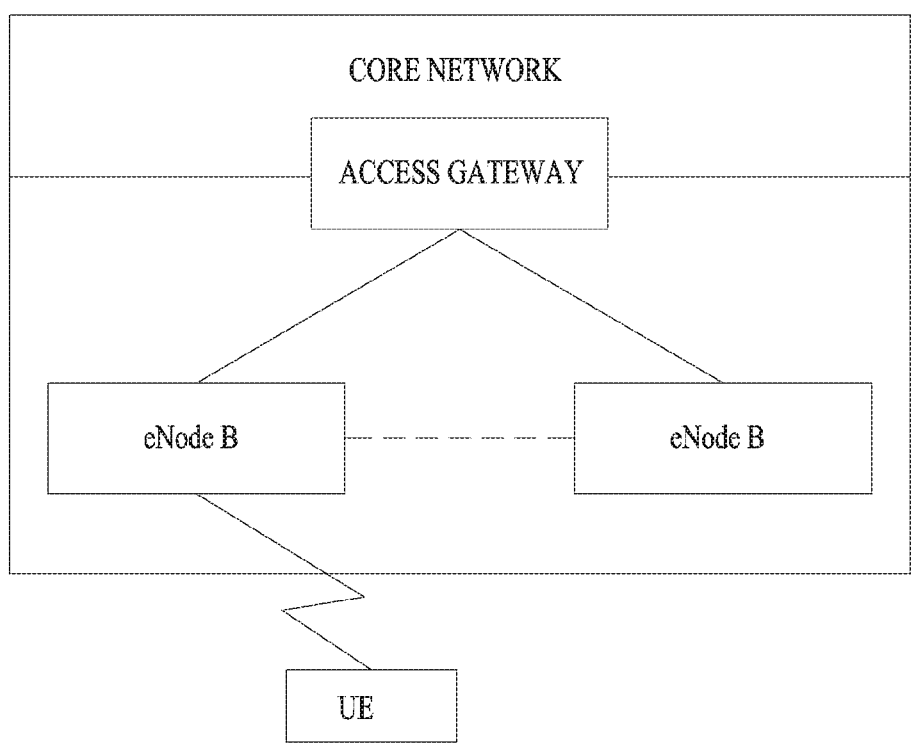
FIG. 1 illustrates a configuration of an Evolved Universal Mobile Telecommunications System (E-UMTS) network as an example of a wireless communication system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system. In addition, while the embodiments of the present disclosure are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (1-1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
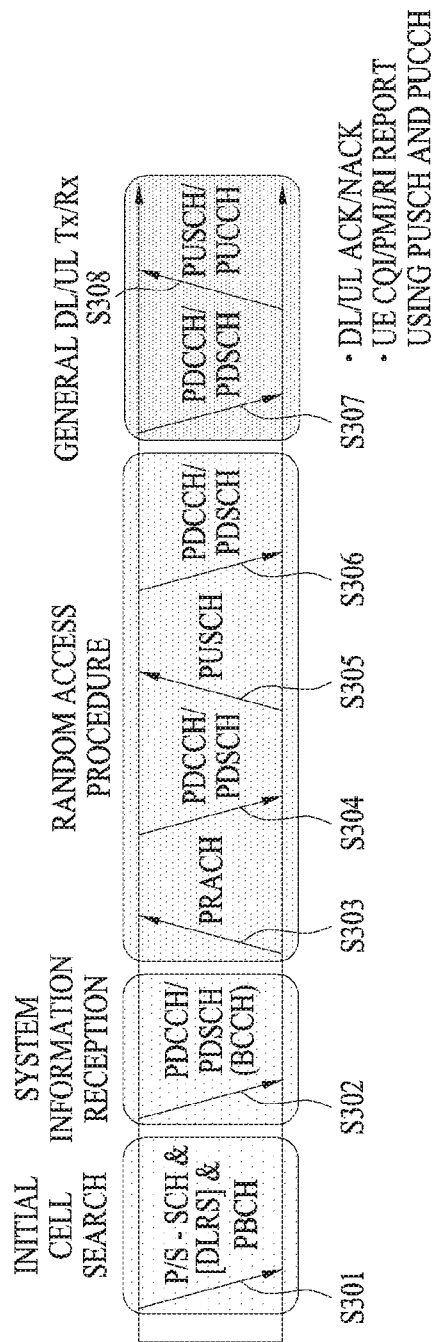
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
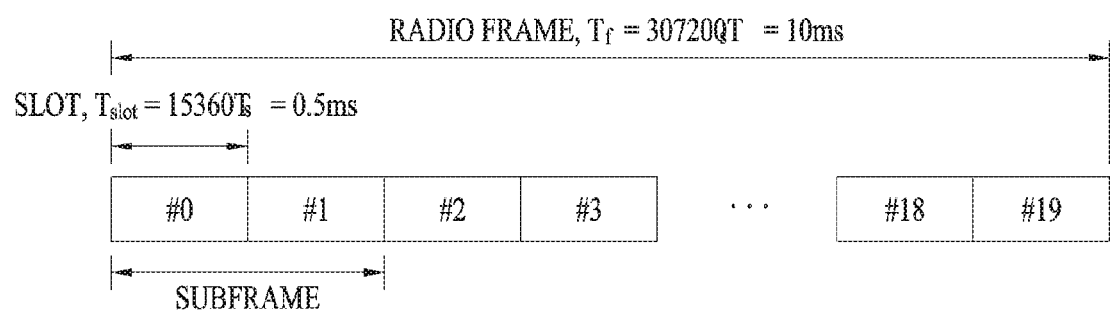
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ \text{kHz}\times 2048)=3.2552\times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
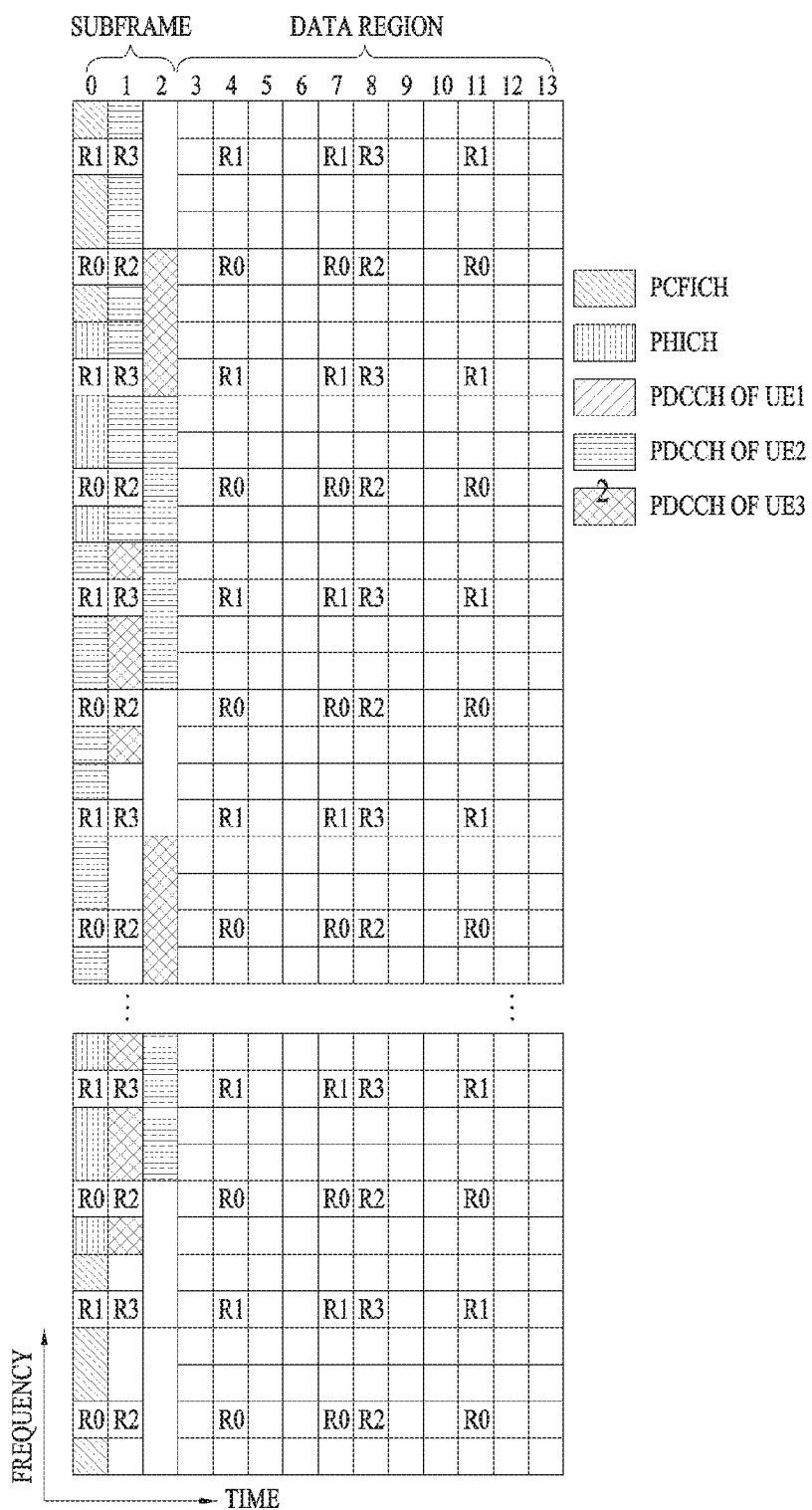
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
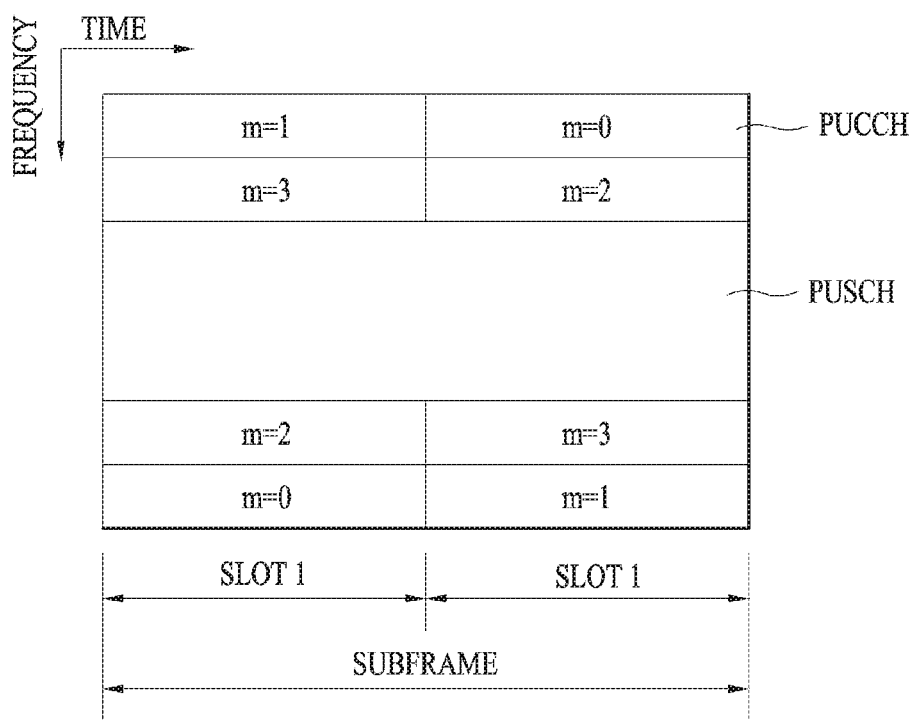
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda(wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
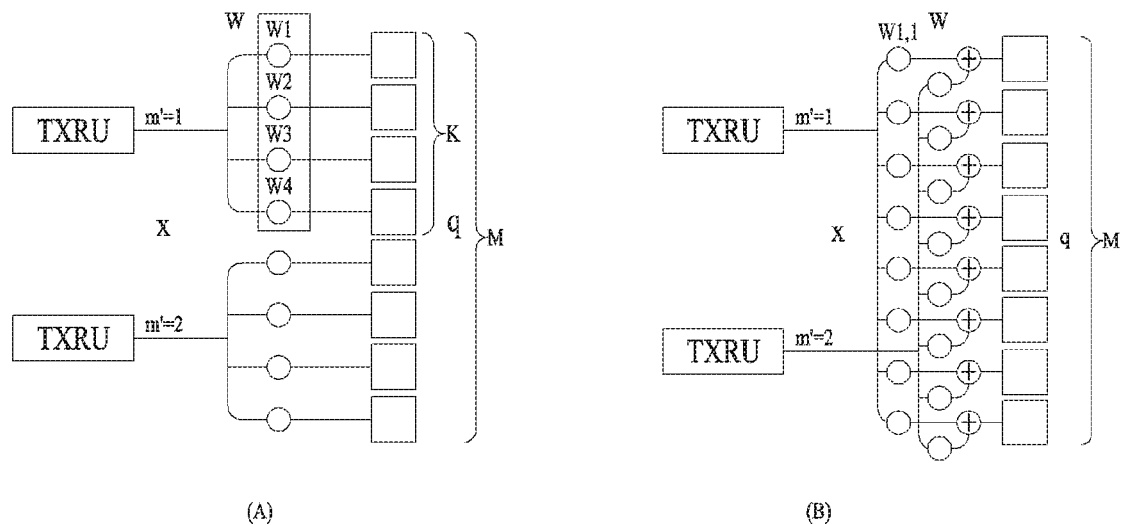
FIG. 7 illustrates examples of a connection scheme between TXRUs and antenna elements.
Figure 8:
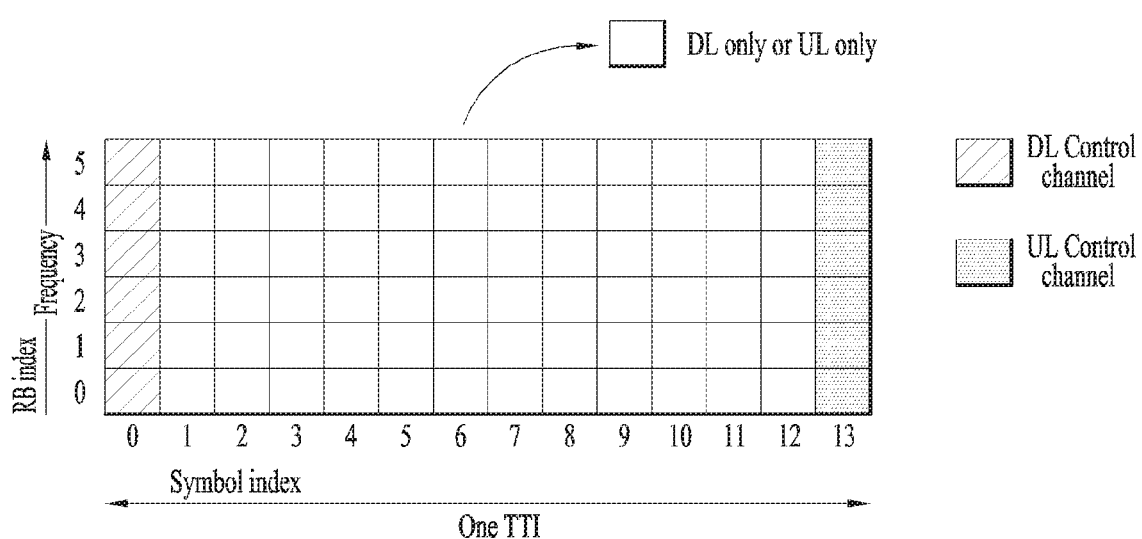
FIG. 8 illustrates an example of a self-contained subframe structure.

FIG. 7 illustrates examples of a connection scheme between TXRUs and antenna elements.

FIG. 7 (a) illustrates that TXRU is connected to a sub-array. In this case, the antenna elements are connected to only one TXRU. Unlike FIG. 7 (a), FIG. 7 (b) illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 10:
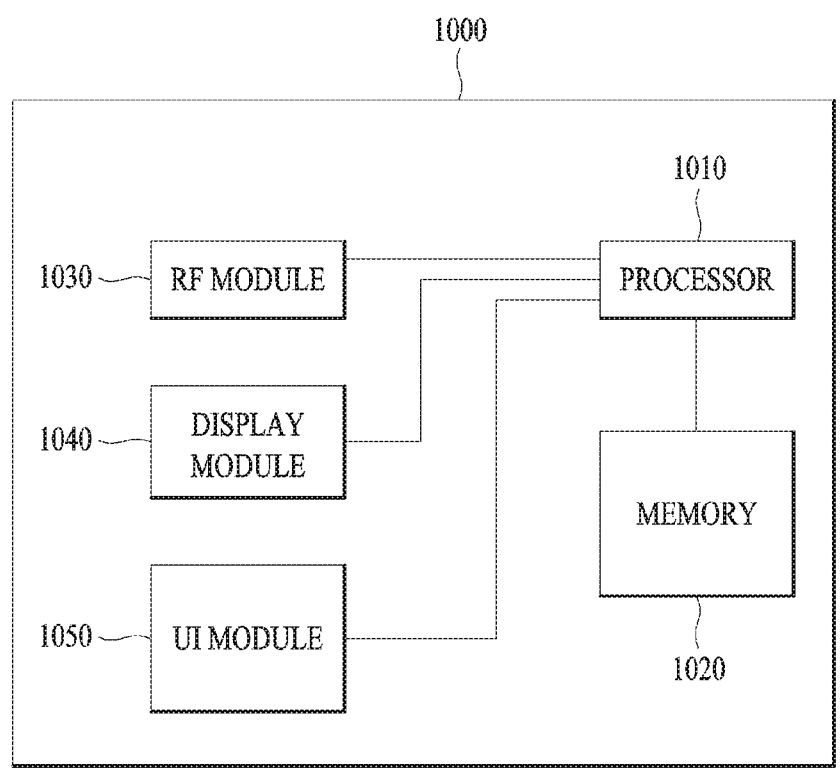
FIG. 10 is a block diagram of a communication device according to one embodiment of the present invention.

A self-contained subframe structure shown in FIG. 10 is considered in the fifth generation NewRAT to minimize data transmission latency in a TDD system. FIG. 10 illustrates an example of a self-contained subframe structure.

In FIG. 10, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period downlink control period+downlink data period downlink control period+GP+uplink data period+uplink control period downlink control period+GP+uplink data period The present invention proposes a method of reducing or managing interference in case that a DL and a UL work as interference on each other within a reference time unit such as a subframe.

In the $5^{th}$ generation NewRAT, it is able to consider configuration including a DL transmission part, a GP and a UL transmission part within a reference time unit such as a subframe unit. A base station can adjust a UL transmission part and a DL transmission part configuring a reference time unit according to a traffic condition, a surrounding situation and the like. For example, a downlink-only subframe may be configured with a DL signal only. If a UL transmission part is greater than a DL transmission part, a reference time unit may be configured with a DL signal, a GP and a UL signal for the purpose of UL data transmission. On the contrary, if a UL transmission part is smaller than a DL transmission part, it can be configured with a DL signal, a GP and a UL for the purpose of Uplink Control Information (UCI) transmission. In this case, a time interval for transmitting a physical channel (hereinafter, xPUCCH) for the purpose of UCI transmission may be very restrictive like 1 symbol or 2 symbols for example.

Meanwhile, a frame used for signal transmission may have various frame structures according to elements and methods for configuring a reference time unit. And, a frame structure can be changed semi-statically or dynamically according to a traffic or indication of a base station. Moreover, frame structures among a plurality of cells may be different, and it may be general that transmission or reception timing is asynchronously configured between different cells.

In this case, between the different cells, it may cause a problem that UL transmission and DL transmission collide with each other. If so, in aspect of a User Equipment (UE) that receives a DL, UL transmission of another UE may work as interference. Likewise, in aspect of a base station that receives a UL, DL transmission of another cell may work as interference. As a most convenient method to solve such a problem, it is able consider changing a frame structure semi-statically and coordinating the corresponding information through inter-cell sharing, which may be inefficient in aspect of resource utilization.

Therefore, the present invention intends to propose a method of efficiently reducing inter-cell or intra-cell interference due to collision between DL transmission and UL transmission.

<Method of Reducing Inter-Cell Interference Between a UL Signal and a DL Signal—Configuration of Power Reduction Duration within TTI>

As described above, a frame used for signal transmission can have various frame structures according to elements and methods of configuring a reference time unit and each cell can use a frame structure different per cell.

Yet, frame structure use information indicating what kind of frame structure is used by each cell may not be instantly shared between cells. For example, for the duration in which a specific cell uses a downlink-only subframe, another cell may use a subframe configured with a DL transmission part, a GP and a UL transmission part. In this case, in aspect of a UE currently transmitting PUCCH, due to DL interference caused by a cell currently using a downlink-only subframe, an SINR at a base station end receiving the PUCCH may be lowered.

Particularly, in the 5$^{th}$ NewRAT, a time duration for transmitting PUCCH for UCI transmission may be very restrictive. Hence, an SINR required for reliable transmission may be high. Thus, a process for reducing DL interference of another cell may be significant.

Accordingly, according to an embodiment of the present invention, as part of protecting specific UL channel transmission of another cell, a power reduction duration is configured in a subframe despite that a specific cell is using a downlink-only subframe. So to speak, a base station can lower power for the corresponding power reduction duration in comparison to other regions. Through this, in case of uplink transmission of another cell, DL interference can be reduced.

Particularly, a base station can configure whether to apply a power reduction operation through a higher layer. If the power reduction operation is configured, it is able to additionally configure duration information for configuring a DL power differently. In doing so, if transmission/reception timing between neighbor cells is synchronous, a power reduction duration may be configured for an actual UL transmission location or a reserved UL transmission location without signaling of the power reduction duration. Here, a transmitted UL may include PUCCH. Meanwhile, if transmission/reception timing between neighbor cells is asynchronous, a power reduction duration may be configured by a higher layer.

In some implementations, when a DL power is configured, a base station can independently configure a power for each of a duration configured as a power reduction duration and a duration not configured as a power reduction duration. Or, a power control or allocation of a base station for a power reduction duration may be configured in consideration of an additional offset or ratio value with reference to a power control of a region not configured as a power reduction duration. Meanwhile, a UE recognizes a changeable power during a single data transmission like PDSCH, thereby being able to perform QAM demodulation appropriately.

Particularly, if a power set for a power reduction duration is set smaller than a power in a region other than the corresponding duration by a predetermined level or higher, mapping by a single PDSCH may be inefficient. Hence, in such a case, a base station may apply a separate coding to each of a duration configured as a power reduction duration and a duration not configured as a power reduction duration and then perform mapping. For example, a separate Transport Block (TB) can be allocated to a power reduction duration, and the corresponding TB can be mapped to a DL signal corresponding to the power reduction duration.

For another example, a TB allocated for DL data can be divided into a TB part to be mapped to a power reduction duration and a TB part to be mapped to other parts according to a specific reference or a setting value by higher layer signaling. Here, the specific reference may include a symbol occupation rate of DL data and the setting value by the higher layer signaling may include a power ratio assigned to a power reduction duration and other duration. Moreover, as a TB is divided according to a power reduction duration, DCI for a TB to be mapped to the power reduction duration and DCI for a TB to be mapped to other parts can be transmitted respectively.

Figure 9:
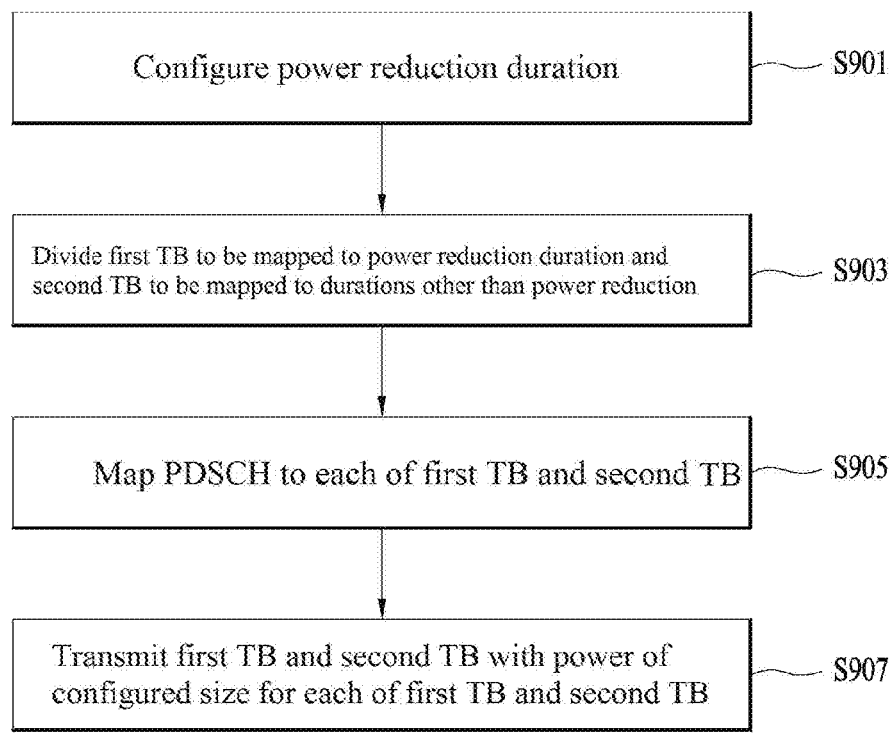
FIG. 9 is a diagram showing a method of controlling power along a power reduction duration according to an embodiment of the present invention.

Namely, as shown in FIG. 9, a base station may configure a power reduction duration [S910] and then divides TBs into a first TB to be mapped to the power reduction duration and a second TB to be mapped to a duration other than the power reduction duration [S903]. The base station may map PDSCH to each of the first TB and the second TB [S905] and then transmit each of the TBs to a UE with a power of a set size [S907].

In some implementations, although the embodiment of the present invention is described in aspects of DL power control and DL power assignment, it is obvious that the embodiment is extensible or applicable in an aspect of UL power control. Moreover, although PUCCH transmission is taken as an example in the above embodiment, other UL channels like PUSCH or Sounding Reference Signal (SRS) can become objects to protect as well.

According to another embodiment, when DL/UL power control (or DL/UL power assignment) is performed, it is able to consider both of the DL power control and the UL power control (or both of the DL power assignment and the UL power assignment). Namely, in performing DL power control, UL power control can be considered. In performing DL power assignment, UL power assignment can be considered.

For example, it is able to reduce a power of a signal including information of low significance according to priority. In particular, if significance of a signal transmitted in UL is lower than that of a signal transmitted in DL, a power of UL can be reduced. Otherwise, a DL power can be reduced.

In this case, the priority, i.e., the significance of transmission can be set according to a type of information transmitted in UL or DL. Such a priority may be configured through higher layer signaling or in advance.

In the legacy LTE system, as inter-cell interference considered information such as High Interference Indicator (HII), Wide Overload Indicator (WOI) or the like is exchanged between different cells, UL power control can be performed using the exchanged information. Moreover, in case of DL, information such as Relative Narrowband TX Power Indicator (RNTP) is exchangeable.

Meanwhile, in the next generation NewRAT system, DL and UL are flexibly usable at the same timing between neighbor cells. Hence, an exchange of interference information between different cells may not be limited to an inter-DL exchange or an inter-UL exchanged. Namely, such an information exchange may not be limited to an exchange of interference information on DL at a DL transmission timing or an exchange of interference information on UL at a UL transmission timing only. So to speak, at a DL transmission timing, interference information on DL and UL of a neighbor cell is exchanged, which can be utilized for power control. Moreover, in a power reduction duration, DL transmission can be skipped irrespective of a frame structure.

Generally, in case that a frame structure is dynamically changed, it is unable to instantly obtain a timing at which UL transmission is actually performed in a neighbor cell. In this case, if a power reduction operation is performed in a power reduction duration, it may happen that a DL power is reduced unnecessarily despite that UL transmission in a neighbor cell does not exist actually.

In doing so, if an inter-cell ideal backhaul is assumable, it is able to dynamically configure information on a power reduction duration or power information in the corresponding duration. If the inter-cell ideal backhaul is not assumable, it is able to indicate a presence or non-presence of UL transmission or information on a power reduction operation using specific DCI or a specific field within DCI. Moreover, one or more candidate groups for a duration for not transmitting UL or a duration for not performing a power reduction operation in consideration of DCI overhead may be configured in advance through a higher layer.

For another example, cells can exchange information such as traffic statistics and the like with each other. Based on the exchanged information, a power reduction duration can be reconfigured at a specific timing. Namely, although information on a power reduction duration or power information in the corresponding duration is configured through higher layer signaling, a power reduction duration can be reconfigured on the basis of information exchanged between cells at a specific timing.

According to the embodiment of the present invention, in order to protect transmission and reception for a neighbor cell, it is described that a power is configured for a specific duration independently and differently. Yet, in a way different from the above description, a specific duration is configured and a beam direction, a beam pattern, an analog beamforming and the like can be applied or configured for the corresponding duration. For example, assuming that a plurality of suitable beam directions exist for a specific DL data transmission, when a single DL data transmission is performed, a beam direction applied in a specific duration may be configured different from a beam direction applied in the rest of durations.

<Method of Reducing Intra-Cell Interference Between a UL Signal and a DL Signal>

In the next generation NewRAT, in an aspect of a base station, an operation that DL transmission and UL reception simultaneously occur on the same frequency or time resource, i.e., a full-duplex operation can be introduced. In this case, it may happen that interference is caused between DL and UL even within a single cell.

For example, a frame structure may include a UE-specific or UE-group-specific operation instead of a cell-specific operation. Namely, while a downlink-only subframe is assigned to a specific UE, a subframe including a DL transmission part, a GP and a UL transmission part may be assigned to another UE. In the above situation, assuming that the specific UE receives a DL from the downlink-only subframe, if interference is caused due to UL transmission from another UE, DL reception performance may be degraded.

To prevent such degradation of DL reception performance, when DL data is transmitted, a transmission frame can be mainly divided into two parts. One is a part that is maintained as DL or avoids collision with PUCCH irrespective of a frame structure, while the other is a part that is configured as UL or capable of performing PUCCH transmission according to a frame structure. Meanwhile, for the two divided parts, mapping methods and transmission methods can be differentiated despite a single DL data transmission.

For example, according to a frame structure, like the last 1 or 2 symbols, the part transmittable as PUCCH can be transmitted in form of being CDMed with PUCCH even in case of DL transmission. So to speak, CDM between UL transmission and DL transmission can be supported in a manner of applying a sequence based cyclic shift or Orthogonal Cove Code (OCC). In this case, although a full part of the UL transmission and a full part of the DL transmission can be CDMed, the full part of the UL transmission and a small part of the DL transmission may be CDMed together.

In some implementations, in case of a signal DL data transmission (i.e., PDSCH transmission), a transmission method may differ according to a duration. For example, a general DL transmission method is applied to a specific duration and CDM between DL transmission and UL transmission is applied to another duration so as to perform transmission. In this case, regarding transmission block allocation, a separate TB may be allocated per duration corresponding to each transmission method, or a single TB may be allocated in a manner of being divided according to a size of each duration or information configured by a higher layer. Here, the information configured by the higher layer may include a ratio of a size per duration. In this case, a cyclic shift value or an orthogonal cover code value of a CDM-based DL transmission part may be fixed in advance or configured by an indication value of DCI on the corresponding PDSCH.

The embodiments in the above description of the present invention are non-limited by inter-cell or intra-cell interference and applicable irrespective of the above situations.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present disclosure described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the above-described method of transmitting UL control information in a wireless communication system and apparatus therefor are described by focusing on an example of being applied to the 5G NewRAT system, they are applicable to various kinds of mobile communication systems as well as to the 5G NewRAT system.

What is claimed is:
1. A method of transmitting a signal by a transmitting device in a wireless communication system, the method comprising:
 identifying a first region where a first transmission power is applied and a second region where a second transmission power is applied;
 generating a first transport block corresponding to the first region and a second transport block corresponding to the second region;
 transmitting, to a first device, a first signal for the first transport block with the first transmission power through the first region;
 transmitting, to the first device, a second signal for the second transport block with the second transmission power through the second region; and
 receiving, from a second device, a third signal including control information through the first region,
 wherein the third signal and at least part of the first signal are multiplexed based on code division multiplexing (CDM),
 wherein the first transmission power is lower than the second transmission power,
 wherein the first region comprises resources where uplink transmission is performed in a neighbor cell,
 wherein, in case that a transmission/reception timing of the transmitting device is synchronized with the neighbor cell, a region reserved for an uplink transmission is configured as the first region, and
 wherein, in case that the transmission/reception timing of the transmitting device is not synchronized with the neighbor cell, the first region is configured by a higher layer.

2. The method of claim 1, further comprising:
 transmitting downlink control information (DCI) including information related to the first region to a user equipment.

3. The method of claim 1, further comprising transmitting information related to one or more candidate regions configurable as the first region to a user equipment through higher layer signaling.

4. The method of claim 1, wherein the first region is configured based on traffic information received from the neighbor cell.

5. The method of claim 1, wherein the first region is configured based on a priority configured according to a type of a downlink signal and a type of an uplink signal.

6. The method of claim 1, wherein the first region and the second region occupy different time durations in a slot.

7. The method of claim 1, wherein the first power is configured independently from the second power.

8. The method of claim 1, further comprising:
 receiving, from the neighbor cell, information including at least one of first information related to inter-cell interference, second information related to the uplink transmission in the neighbor cell, third information related to traffic statistics in the neighbor cell; and
 determining the first region based on the information.

9. The method of claim 1, further comprising:
 classifying data into first data for the first transport block and second data for the second transport block based on symbol occupation rates of the first data and the second data.

10. A transmitting device for transmitting a downlink signal in a wireless communication system, the transmitting device comprising:
 a transceiver configured to transmit and receive a wireless signal; and
 a processor configured to control the transceiver,
 wherein the processor is further configured to:
 identify a first region where a first transmission power is applied and a second region where a second transmission power is applied,
 generate a first transport block corresponding to the first region and a second transport block corresponding to the second region,
 transmit, to a first device, a first signal for the first transport block with the first transmission power through the first region,
 transmit, to the first device, a second signal for the second transport block with the second transmission power through the second region, and
 receive, from a second device, a third signal including control information through the first region,
 wherein the third signal and at least part of the first signal are multiplexed based on code division multiplexing (CDM),
 wherein the first transmission power is lower than the second transmission power,
 wherein the first region comprises resources where uplink transmission is performed in a neighbor cell,
 wherein, in case that a transmission/reception timing of the transmitting device is synchronized with the neighbor cell, a region reserved for an uplink transmission is configured as the first region, and wherein, in case that the transmission/reception timing of the transmitting device is not synchronized with the neighbor cell, the first region is configured by a higher layer.

11. The transmitting device of claim 10, wherein the processor is further configured to transmit downlink control information (DCI) including information related to the first region to a user equipment.

12. The transmitting device of claim 10, wherein the processor is further configured to transmit information related to one or more candidate regions configurable as the first region to a user equipment through higher layer signaling.

13. The transmitting device of claim 10, wherein the first region is configured based on traffic information received from the neighbor cell.

14. The transmitting device of claim 10, wherein the first region is configured based on a priority configured according to a type of the downlink signal and a type of an uplink signal.

* * * * *